United States Patent [19]

Isakson et al.

[11] Patent Number: 5,709,438

[45] Date of Patent: Jan. 20, 1998

[54] FAILED BOOSTER BACK-UP BRAKING SYSTEM

[75] Inventors: Larry E. Isakson, Mishawaka, Ind.;
John E. Mackiewicz, Niles, Mich.;
William Kent Messersmith, Granger;
Jeffery E. Devall, Liberty, both of Ind.;
Michael E. Gatt, Grosse Lie, Mich.

[73] Assignee: Robert Bosch Technology Corporation, Farmington Hills, Mich.

[21] Appl. No.: 769,982

[22] Filed: Dec. 19, 1996

[51] Int. Cl.⁶ ........................................ B60T 8/32
[52] U.S. Cl. ................. 303/113.4; 188/358; 303/14;
303/10; 303/113.3; 303/114.1; 303/122.12;
303/155; 303/166; 303/DIG. 4; 303/116.1
[58] Field of Search .................... 303/113.3, 122.12,
303/122.13, 10–12, 116.1–116.4, 155, 113.4,
13, 14, 113.1, 113.2, 114.1, 114.2, 119.2,
119.1, 117.1, 15, 3, 166, 115.2, DIG. 3,
DIG. 4; 188/358; 60/582, 545, 547.1, 555,
567, 566

[56] References Cited

U.S. PATENT DOCUMENTS

| | | | |
|---|---|---|---|
| 3,675,422 | 7/1972 | Drutchas et al. | 303/114.1 |
| 4,462,642 | 7/1984 | Leiber | 303/122.13 |
| 4,477,125 | 10/1984 | Belart et al. | 60/582 |
| 4,755,008 | 7/1988 | Imoto et al. | 303/DIG. 4 |
| 4,792,192 | 12/1988 | Tveitane | 303/DIG. 3 |
| 4,812,777 | 3/1989 | Shirai | 303/14 |
| 4,919,493 | 4/1990 | Leiber | 303/DIG. 3 |
| 5,031,968 | 7/1991 | Takata | 303/15 |
| 5,044,697 | 9/1991 | Longyear et al. | 303/14 |
| 5,190,358 | 3/1993 | Holzmann et al. | 303/DIG. 4 |

*Primary Examiner*—Douglas C. Butler
*Attorney, Agent, or Firm*—Leo H. McCormick, Jr.

[57] ABSTRACT

A back-up power assisted braking system substitutes an intermittently actuated secondary source of pressurized hydraulic fluid such as a traction control/anti-lock pump and motor (41) for the normal braking power assist upon the detection of a failure in the primary power assisted braking system. A failure may be detected in responsive to sensing simultaneous brake pedal (23) displacement and a lack of fluid flow for providing an abnormality signal. Also, a failure may be detected by sensing a predetermined difference between the commanded braking force (45) and the actual braking forces (38, 49). There is a pressure transducer (45) which provides an indication of brake pedal commanded braking force and a hydraulic circuit (43, 53 or 55, 51) interconnecting the secondary source outlet, the individual wheel brake actuators (14) and secondary source inlet. A normally open solenoid operated valve (31, 47) is interposed in the hydraulic circuit between the wheel brake actuators and the secondary source inlet, and a control arrangement is coupled to the pressure transducer to provide an output voltage for enabling the solenoid of the solenoid operated hydraulic valve having a magnitude which varies directly as the indicated operator commanded braking force. Thus, the voltage level determines the braking force during back-up braking.

11 Claims, 1 Drawing Sheet

FAILED BOOSTER BACK-UP BRAKING SYSTEM

The present invention relates generally to vehicular braking systems and more particularly to vehicle braking systems having hydraulic power boost, anti-lock and traction control features.

Early power boost braking systems were a combined vacuum and hydraulic unit utilizing the engine intake manifold vacuum and atmospheric pressure to provide power assisted application of vehicle brakes. In the event a source of vacuum was unavailable, for example, because the engine stopped or a vacuum line developed a leak, the brake pedal actuation rod engaged the master cylinder actuating rod and a direct mechanical application of the hydraulic brakes occurred as the pedal was depressed. For various reasons, including increased emission control standards, vacuum powered brake booster systems have been replaced with hydraulically assisted braking systems. The hydraulic power is frequently being generated by a power steering pump in a vehicle but may also be derived from an automatic transmission fluid pressure or a dedicated hydraulic power source. Regardless of the primary boost pressure source, a failure or malfunction may occur in a hydraulic system when such engine driven pumps quit or when the engine stops, a drive belt to the power steering pump may break or slip, or should a hydraulic line may burst or leak. With such hydraulic systems, it is desirable to provide a back-up power source. This back-up power source has frequently taken the form of a separate back-up hydraulic pump and driving motor which is enabled when inadequate power boost is detected. On smaller, lighter weight vehicles, this back-up power source may take the form of a hydraulic fluid accumulator often integral with the power boost unit. U.S. Pat. No. 4,154,059 illustrates one such back-up accumulator.

Many known anti-lock devices operate by cyclically increasing and decreasing the braking torque exerted on the wheels to minimize wheel lock while maintaining as much driver commanded brake torque as the wheel to surface interface will support while maintaining steerability and wheel stability. This is typically achieved by control valves alternately allowing fluid to flow out of and then into the brake cylinder, thus lowering and then raising the brake pressure.

Some antilock braking systems operate on a so-called pump-back principle where the same captive master cylinder hydraulic displaced fluid is directed back into the master cylinder or re-supplied to the brakes subsequent to an anti-lock event. Others operate of a replenish principle where non-captive fluid is re-circulated through an open reservoir.

Many vehicles employ a differential which provides an application of power to both driving wheels even though one of those driving wheels may be turning faster or moving further than the other as, for example, when the vehicle is turning. If one of the differential coupled wheels is allowed to turn freely as when the tire slips on an icy road surface, no driving power is supplied to the other wheel. In an attempt to obviate this total loss of traction problem, so-called limited slip or positive traction differentials provide a clutch mechanism within the differential housing which, under normal driving conditions, slip allow the outside wheel to turn faster than the inside wheel. Under poor traction conditions, the increased friction provided by the clutches increases the driving torque applied to the wheel with the better traction.

The advent of antilock braking systems provided an opportunity to eliminate the weight and cost of these limited slip differentials. The addition of traction control valve(s) in the hydraulic circuits of the powered wheels, allows the anti-lock system upon detection of the condition when the rotational speed of one driven wheel substantially exceeds that of the other and, despite the absence of any driver commanded braking, to provide a braking force to the freely rotating wheel transferring torque back to the wheel with the better traction. Thus, traction control operation is simply a form of anti-lock operation when braking is not being commanded by a driver. Anti-lock systems with a traction control feature, and, as noted earlier, some anti-lock systems without such traction control employ a motor and hydraulic pump which operate independent of the service brake system.

From a weight, cost, and reliability viewpoints, it is highly desirable to eliminate the pump, motor and electronics of the service brake system back-up hydraulic power source in a hydraulically assisted braking system while retaining the availability of power assisted braking in the event of a failure or malfunction of the primary hydraulic source. It is also highly desirable to actually increase the brake pressures available upon utilization of such a back-up system and thereby reduce stopping distances when operating the brakes during a failure of the primary hydraulic source.

In the present invention, a back-up power assisted braking system immediately calls into play an intermittently actuated secondary source of pressurized hydraulic fluid such as a traction control/antilock pump and motor upon the detection of an abnormality in the primary power assisted braking system. The improvement in this back-up power assisted braking system includes an arrangement for sensing an abnormality in the normal power assisted braking system and for providing an signal indicative of such a sensed abnormality. There is a pressure transducer or force sensor which provides an indication of brake pedal commanded braking force and a hydraulic circuit interconnecting the secondary source outlet, the individual wheel brake actuators and secondary source inlet. A normally open solenoid operated valve is interposed in the hydraulic circuit between the wheel brake actuators and the secondary source inlet, and control arrangement is coupled to the pressure transducer and provides an output voltage for enabling the solenoid of the solenoid operated hydraulic valve having a magnitude which varies directly as the indicated operator commanded braking force. Thus, the voltage level determines the braking force during back-up braking. An alternate means of control could be achieved using a simple "on-off" valve, although the control might be less precise. A flow transducer for providing an indication of hydraulic fluid flow from the primary source and a position transducer for providing an indication of brake pedal displacement may be utilized to indicate an abnormality upon detecting simultaneous brake pedal displacement and a lack of fluid flow. Alternatively, a first pressure transducer may provide an indication of brake pedal commanded braking force while a second pressure transducer provides an indication of actual braking force. A comparator then provides a delta signal in response to a predetermined difference between the commanded and actual braking forces.

In accordance with another form the invention, a power assisted braking system of the type having a primary source of pressurized hydraulic fluid and an anti-skid braking feature including an intermittently actuated secondary source of pressurized hydraulic fluid which is normally actuated only during an anti-skid operation or a traction control operation has an improved back-up power assist feature which includes an arrangement for sensing a failure of the primary source of pressurized hydraulic fluid to provide appropriate power assist during braking, and circuitry responsive to such a sensed failure which effects a substitution of the secondary source of pressurized hydraulic fluid for the first source of pressurized hydraulic fluid so as to continue to provide power assisted braking despite the failure of the primary source of pressurized hydraulic fluid.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
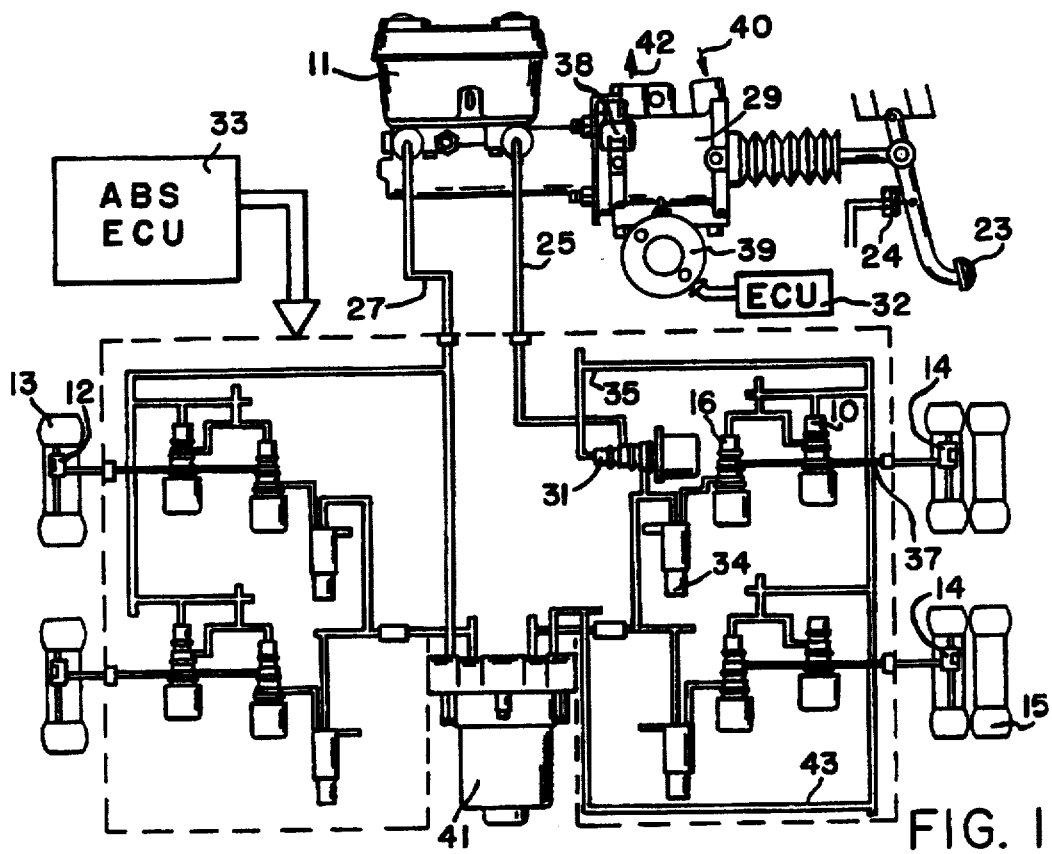
FIG. 1 is a schematic representation of a prior art brake, traction control and anti-skid system.

FIG. 1 illustrates a portion of a prior art antilock braking system for use in a light truck or similar vehicle. Such a vehicle is driven by the rear wheels and which most commonly, as illustrated, have dual rear tires but the principles of this invention would apply equally to other configurations. The system includes solenoid actuated anti-lock valves 10 and 16 which are located between an operator-controlled pressure source or master cylinder 11 and corresponding from wheel 13 and rear wheel 15 hydraulic brake actuators 12 and 14, respectively. Typically, the pressure source 11 is a conventional master cylinder having two separate circuits, one for the front vehicle wheel 13 brakes and the other for the rear wheel 15 brakes. In the system, rotational speed sensors associated with the vehicle wheels provide electrical indications of the angular velocities of individual wheels to the anti-lock electronic control unit 33. Hydraulic fluid from a power steering pump having a high pressure (arrow 40) is supplied to booster 29 through an inlet port while low pressure fluid (arrow 42) is returned to a reservoir by way of an outlet port.

When the driver wishes to slow the vehicle, a force is applied to the brake pedal 23, movement of brake pedal 23 caused a conventional brake light switch 24 to be activated at the same time a corresponding hydraulic fluid pressure is supplied by booster 29 to activate master cylinder 11 which supplies the brake system with hydraulic pressure by way of conduits (brake lines) 25 and 27 to the respective rear and front pairs of brake actuators. Hydraulic fluid pressure to the brake system passes through the four individual solenoid actuated anti-lock valves such as 10 and 16. The individual wheel anti-lock valves such as 10 and 16 are normally in a position to supply normal braking fluid pressure by way of line 25. Valve 16 functions as a build and hold valve supplying braking fluid pressure from either line 25 during normal braking or from the accumulator 34 during anti-skid or traction control operation while valve 10 functions as a bleed valve during anti-lock or traction control operation. Thus, fluid flow is from the master cylinder 11 via line 25 through valve 31 and line 35 to valve 16 and finally by way of line 37 to the brake actuating mechanism 14 during normal braking. A similar normal braking fluid flow path exists for the front wheels 13 except there is no valve corresponding to valve 31.

In the event of booster 29 failure, as detected, for example, by low boost pressure flow switch 38, back-up pump-motor unit 39 is enabled by the electronic control unit 32 to supply boost pressure to the master cylinder 11. In the event a loss of traction of one of the driven wheels 15, the actuating solenoid of valve 31 is enabled closing a normally open seat of valve 31 to establish a path of pressurized brake fluid from the pump 41 by way of line 43 to the wheel which has lost traction.

In the event electronic control unit 33 detects a sufficient difference between one or more wheel speeds and vehicle speed to indicate a skid, an actuating signal is sent to the appropriate ones of the solenoid actuated anti-lock valves such as 10 and 16 to shut off the hydraulic fluid path from the master cylinder 11 to the wheel cylinder, and to establish instead a bleed path from the wheel cylinder to a common low pressure reservoir thereby relieving the brake actuator pressure allowing the slipping wheel to accelerate. At a time when wheel speed gets sufficiently close to the vehicle speed, the anti-lock valves 10 and 16 resume their normal braking condition. Periodically, during the time hydraulic fluid is being bled from the brake actuator, valve 16 is actuated to connect accumulator 34 to supply rebuild pressure.

Figure 2:
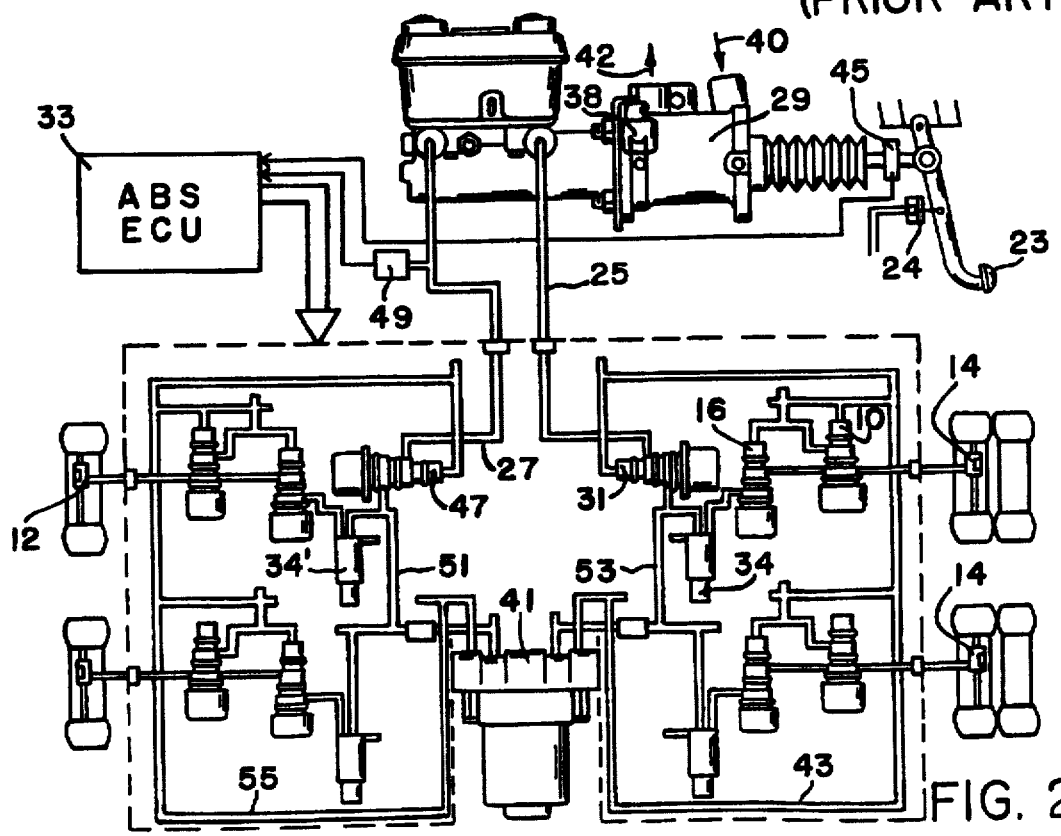
FIG. 2 is a schematic representation similar to the brake, traction control and anti-skid system of FIG. 1, but illustrating the present invention in one form.

FIG. 2 differs from FIG. 1 through the addition of a brake pedal force transducer 45 and a valve 47 similar to the traction control valve 31 but having no traction control function unless the front wheels 13 are also powered. A hydraulic line 55 from the valve 47 analogous to line 43 extends from the valve 47 to one of the outlets of pump 41. Significantly, pump-motor unit 39 has been eliminated from the brake system. During normal braking, conventional anti-lock operation or loss of traction by a rear powered wheel, operation is as described above with respect to FIG. 1. In the event a booster failure is detected by low boost flow pressure switch 38 or the pressure from the master cylinder (sensor 49) is detected to be abnormally low when compared to the pedal force applied (sensor 45), the back-up braking mode is entered. The electronic control unit 33 monitors the un-boosted or at rest fluid pressure from master cylinder 11, energizes the solenoids of traction control valve 31 and 47 to direct master cylinder fluid from line 25 and 27 to lines 53 and 51 respectively and then to the inlets of pump 41. Brake fluid is now pumped by pump 41 to the individual wheel braking units by lines 43 and 55. The closed seats of valves 31 and 47 block the flow of fluid from lines 43 and 55 by way of lines 53 and 51 back to the inlets of pump 41. However, if the pump pressure exceeds the closing force of the solenoid of one of these valves, the valve will open and excess pressure will be bled off back to the pump 41 inlet. The electronic control unit 33 may utilize either the master cylinder pressure indication from sensor 49 or the brake pedal pressure indication from sensor 45 to vary the voltage to the solenoids of valves 31 and 47 thereby controlling the pressure bleed and the pressure applied to the wheel brake actuating mechanisms 12 or 14.

In summary, a power assist braking abnormality may be detected by sensing a predetermined difference between the commanded and actual braking forces or by detecting simultaneous brake pedal displacement and a lack of brake fluid flow. A pressure transducer 45 provides an indication of operator commanded braking force. The secondary (back-up) source 41 has a high pressure outlet coupled by lines 43 and 55 to the individual wheel brake actuators 14 and a low pressure inlet connected to lines 51 and 53, and employs a solenoid operated hydraulic valve 31 or 47 which, when energized, blocks the low pressure return path from the individual wheel brake actuators to the low pressure inlet. A control circuit from electronic control unit 33 provides an output voltage for enabling the solenoid of the solenoid operated hydraulic valve of a magnitude which varies directly as the indicated operator commanded braking force thus controlling braking pressure to the actuators.

It should now be clear that the principles of the present invention are not limited to systems employing back-up pump-motor unit 39. For example, braking systems employing a back-up accumulator such as shown, for example, in U.S. Pat. No. 4,154,059 may also advantageously utilize the techniques of the present invention. With the addition of a flow sensing switch in the high pressure supply line connected to the booster 29, the accumulator back-up may be augmented by the traction control system much as previously discussed. When brake light switch 24 is closed indicating pedal 23 depression and the hydraulic boost fluid flow switch indicates a lack of flow, closure of the solenoids 31 and 47 and energization of pump 41 may commence to provide enhanced boost braking pressure.

What is claimed is:

1. In a vehicle of the type having a brake pedal commanded hydraulic power assisted braking system including a primary source of pressurized hydraulic fluid, a plurality of individual hydraulic wheel brake actuators (14) and an intermittently actuated secondary source of pressurized hydraulic fluid (41) of a type having a high pressure outlet and a low pressure inlet, a back-up power assisted braking system comprising means (38, 45, 49) for sensing an abnormality in the power assisted braking system and for providing an signal indicative of a sensed abnormality, a pressure transducer (45) providing an indication of brake pedal commanded braking force, a hydraulic circuit (43, 53 or 55,51) interconnecting the secondary source outlet, wheel brake actuators (14) and secondary source inlet, a normally open solenoid operated valve (31, 47) interposed in the hydraulic circuit between the wheel brake actuators and the secondary source inlet, and control means (33) coupled to the pressure transducer and providing an output voltage for enabling the solenoid of the solenoid operated hydraulic valve having a magnitude which varies directly as the indicated operator commanded braking force.

2. The back-up power assisted braking system of claim 1 wherein the means (38, 45, 49) for sensing comprises a flow transducer providing an indication of hydraulic fluid flow from the primary source, a position transducer (24) providing an indication of brake pedal (23) displacement, and responsive to simultaneous brake pedal displacement and a lack of fluid flow for providing an abnormality signal to the control means.

3. The back-up power assisted braking system of claim 1 wherein the means (38, 45, 49) for sensing comprises a first pressure transducer (45) providing an indication of brake pedal (23) commanded braking force, a second pressure transducer (38, 49) providing an indication of actual braking force, and comparator means responsive to a predetermined difference between the commanded and actual braking forces for providing an abnormality signal to the control means.

4. In a vehicle of the type having a hydraulic power assisted braking system including a primary source of pressurized hydraulic fluid (11, 29) and an anti-lock braking feature including an intermittently actuated secondary source of pressurized hydraulic fluid (41) normally actuated only during one of and anti-lock operation and a traction control operation, the improvement comprising:

a force transducer (45) providing an indication of operator commanded braking force;

pressure transducer means (38,49) for providing an indication of actual braking force;

control means (33) for comparing said commanded and actual braking forces and responding to responsive to a predetermined difference between said commanded and actual braking forces for developing an operational signal indicative of a failure of the primary source of pressurized hydraulic fluid; and means (31,34,34',47) actuated by said operational signal for substituting the secondary source of pressurized hydraulic fluid (41) for the first source of pressurized hydraulic fluid (11,29) to provide appropriate power assist to continue power assisted braking despite the failure of the primary source of pressurized hydraulic fluid.

5. The improvement of claim 4 wherein the means (31, 34,47,34') for substituting comprises a two position solenoid operated hydraulic valve (31, 47).

6. The improvement of claim 4 wherein the primary source of pressurized hydraulic fluid (40) comprises an engine driven power steering pump.

7. The improvement of claim 4 wherein the vehicle braking system includes a booster (29) powered by the primary source, a master cylinder (11) and a plurality of individual wheel brake actuators (14), and wherein the means (31,34,47,34') for substituting comprises a two position solenoid operated hydraulic valve (31, 47) operable in an unenergized position to selectively supply pressurized brake fluid to individual wheel brake actuators.

8. The improvement of claim 7 wherein the means (31, 34,47,34') for substituting further includes means for enabling the secondary source (41) and means for energizing the solenoid operated hydraulic valve (31, 47).

9. The improvement of claim 4 wherein said secondary source of pressurized fluid (41) has a high pressure outlet and a low pressure inlet; said means (31,34,47,34') for substituting including a solenoid operated hydraulic valve (31,47), said solenoid operated hydraulic valve (31,47) when energized, blocking a low pressure return path (51, 53) from the individual wheel brake actuators to said low pressure inlet; said control means (33) being coupled to the pressure transducer (45) for providing an output voltage to enable said solenoid operated hydraulic valve (31,47), said output voltage having a magnitude which varies directly as the indicated operator commanded braking force.

10. In a vehicle of the type having a hydraulic power assisted braking system including a primary source of pressurized hydraulic fluid (11, 29) and an anti-lock braking feature including an intermittently actuated secondary source of pressurized hydraulic fluid (41) normally actuated only during one of and anti-lock operation and a traction control operation, the improvement comprising:

means (38, 45, 49) for sensing a failure of the primary source of pressurized hydraulic fluid to provide appropriate power assist during braking, said means (38, 45, 49) for sensing including a flow transducer (38) for providing an indication of hydraulic fluid flow from the primary source and a position transducer (45) for providing an indication of brake pedal displacement, said means (38, 45, 49) for sensing being responsive to simultaneous brake pedal (23) displacement and a lack of fluid flow for developing said a failure signal; and means (31,34,34,47) actuated by said failure signal for substituting the secondary source of pressurized hydraulic fluid (41) for the first source of pressurized hydraulic fluid (11,29) to thereby continue to provide power assisted braking despite the failure of the primary source of pressurized hydraulic fluid.

11. In a vehicle of the type having a hydraulic power assisted braking system including a primary source of pressurized hydraulic fluid (11, 29) and an anti-lock braking feature including an intermittently actuated secondary source of pressurized hydraulic fluid (41) normally actuated only during one of and anti-lock operation and a traction control operation, the improvement comprising:

means (38, 45, 49) for sensing a desired fluid pressure level of the primary source of pressurized hydraulic fluid (11,29) to provide appropriate power assist during braking, said means (38, 45, 49) for sensing including a force transducer (45) for providing an indication of operator commanded braking force and transducer means (38,49) for providing an indication of actual braking force; control means (33) for comparing said commanded and actual braking forces and responding to a predetermined difference between said commanded and actual braking forces for developing an enhancement signal; and means (31,34,34',47) actuated by said enhancement signal for combining said secondary source of pressurized hydraulic fluid (41) with said first source of pressurized hydraulic fluid (11,29) to meet said desired fluid pressure level corresponding to said operator commanded braking force.

* * * * *